J. C. RICHARDSON.
Potato Digger.

N⁰. 65,434.

Patented June 4, 1867.

Witnesses:
Theo Tusche
Wm Trewin

Inventor:
J C Richardson
Per Munn & Co
Attorneys

United States Patent Office.

J. C. RICHARDSON, OF BENTON, MAINE, ASSIGNOR TO HIMSELF AND WILLIAM SIMPSON, OF THE SAME PLACE.

Letters Patent No. 65,434, dated June 4, 1867.

POTATO-DIGGER.

*The Schedule referred to in these Letters Patent and making part of the same.*

TO ALL WHOM IT MAY CONCERN:

Be it known that I, J. C. RICHARDSON, of Benton, in the county of Kennebec, and State of Maine, have invented a new and useful improvement in Potato-Digger; and I do hereby declare that the following is a full, clear, and exact description thereof, which will enable others skilled in the art to make and use the same, reference being had to the accompanying drawings forming part of this specification, in which—

Similar letters of reference indicate like parts.

My invention has for its object to furnish an improved machine by means of which potatoes may be dug rapidly and thoroughly; and it consists in attaching the teeth of the digger directly to the axle of the machine; in operating the digger to lift the potatoes from the ground by means of a lever attached to the axle of the machine; and in the combination of a screen and receiving box with the digger, the whole being constructed and arranged as hereinafter more fully described.

Figure 1:
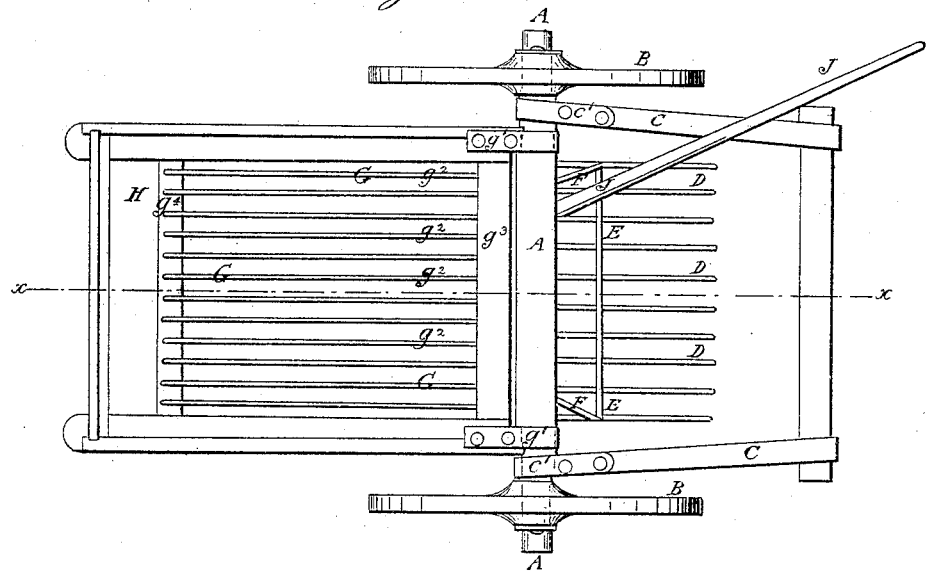
Figure 1 is a top or plan view of my improved machine.
Figure 2:
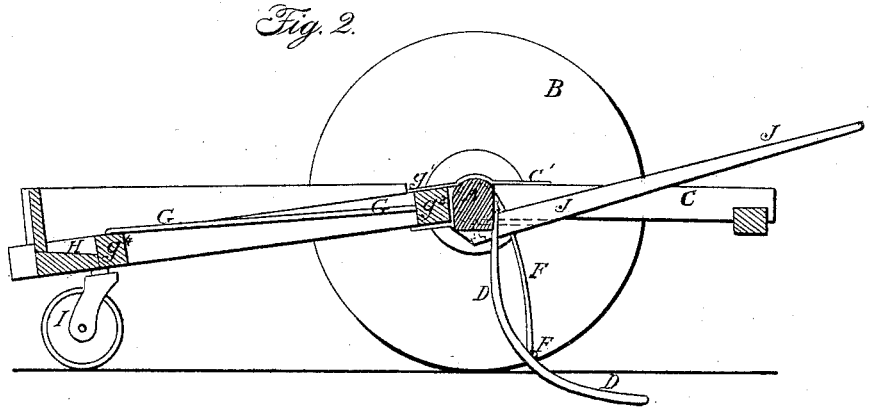
Figure 2 is a vertical longitudinal section of the same, taken through the line $x\ x$, fig. 1.

A is the axle, to which the wheels B are attached in the ordinary manner. C are the draught-bars, to which the horses are attached to draw the machine. The ends of the bars C are secured to the axle A by bands $c'$ passing around said axle, and the ends of which are secured to the said bars so that the said axle may be free to turn therein as required. D are the digger-teeth, the upper ends of which are securely attached to the axle A, and which are made substantially in the form shown in fig. 2. The teeth D are connected, held in their proper relative positions, and strengthened by a cross-bar, E, to which all the teeth are attached. The said teeth are further strengthened by the braces F, the lower ends of which are attached to the bar E near its ends, and their upper ends to the axle A. G is the screen. The forward end of the frame of the screen is connected to the axle A by bands $g^1$ passing around the said axle, and the ends of which are attached to the said frame. The screen is formed by rods or slats, $g^2$, extending from the front cross-bar $g^3$ to the cross-bar $g^4$ of said frame. H is a receiving box formed in the rear end of the screen-frame to receive the potatoes from said screen. The rear end of the screen-frame is supported upon caster-wheels, I, as shown in fig. 2. The digger is operated to raise the potatoes out of the ground by lever J, the inner end of which is securely attached to the axle A.

In using the machine it is drawn across the rows, and when the teeth D are run under a row the horses are stopped, and the lever J operated to raise the potatoes and dirt and throw them upon the separator or screen G. A man with a rake then rakes off the tops or vines, the dirt falling through, and the potatoes rolling down the screen to the receiving box H. When it is desired to operate the machine with one horse, the machine should be made narrower, and the draught-bars C may be extended so as to form thills.

Having thus described my invention, what I claim as new, and desire to secure by Letters Patent, is—

1. Attaching the teeth D of the digger directly to the axle A of the machine, substantially as herein shown and described.

2. Operating the digger to lift the potatoes from the ground by means of the lever J attached to the axle A, substantially as herein shown and described.

3. The combination of the screen G and receiving box H with the axle A and teeth D, substantially as herein shown and described and for the purposes set forth.

J. C. RICHARDSON.

Witnesses:
  MADISON CROWELL,
  CROSBY HINDS.